United States Patent
Kondo et al.

(10) Patent No.: US 10,713,774 B2
(45) Date of Patent: Jul. 14, 2020

(54) ASSESSMENT METHOD, LASER DEVICE, AND SENSOR PRODUCTION METHOD

(71) Applicant: NGK SPARK PLUG CO., LTD., Nagoya, Aichi (JP)

(72) Inventors: Tsuyoshi Kondo, Ichinomiya (JP); Atsushi Mori, Komaki (JP)

(73) Assignee: NGK SPARK PLUG CO., LTD., Nagoya (JP)

(*) Notice: Subject to any disclaimer, the term of this patent is extended or adjusted under 35 U.S.C. 154(b) by 425 days.

(21) Appl. No.: 15/511,282

(22) PCT Filed: Oct. 1, 2015

(86) PCT No.: PCT/JP2015/005011
§ 371 (c)(1),
(2) Date: Mar. 15, 2017

(87) PCT Pub. No.: WO2016/051807
PCT Pub. Date: Apr. 7, 2016

(65) Prior Publication Data
US 2017/0301076 A1    Oct. 19, 2017

(30) Foreign Application Priority Data
Oct. 2, 2014 (JP) ................................. 2014-203612

(51) Int. Cl.
*G06T 7/00* (2017.01)
*G01N 21/88* (2006.01)
(Continued)

(52) U.S. Cl.
CPC ............ *G06T 7/001* (2013.01); *B23K 26/032* (2013.01); *B23K 26/244* (2015.10);
(Continued)

(58) Field of Classification Search
CPC .......... G06T 7/001; G06T 7/70; G01B 11/14; G01B 11/24; B23K 26/282; B23K 31/125;
(Continued)

(56) References Cited

U.S. PATENT DOCUMENTS

| 5,841,098 A | * | 11/1998 | Gedrat | ................... B23K 26/04 |
| | | | | 219/121.63 |
| 6,274,843 B1 | * | 8/2001 | Dabezies | ............. B23K 26/244 |
| | | | | 219/121.63 |

(Continued)

FOREIGN PATENT DOCUMENTS

| JP | H06-106371 A | 4/1994 |
| JP | H08-136473 A | 5/1996 |

(Continued)

OTHER PUBLICATIONS

Japan Patent Office, International Search Report issued in corresponding Application No. PCT/JP2015/005011 dated Dec. 15, 2015.
Japan Patent Office, Written Opinion issued in corresponding Application No. PCT/JP2015/005011, dated Dec. 15, 2015 (English translation not available).
Japan Patent Office, Office Action (Decision of Refusal) issued in corresponding Application No. 2016-551558, dated Jun. 19, 2017.

*Primary Examiner* — Joseph G Ustaris
*Assistant Examiner* — Jill D Sechser
(74) *Attorney, Agent, or Firm* — Stites & Harbison, PLLC; Jeffrey A. Haeberlin; James R. Hayne (57) ABSTRACT

Disclosed is an assessment method for making an assessment of laser welding between first and second cylindrical metal members, wherein the first and second cylindrical metal members are arranged coaxially to define an overlap range where the first and second cylindrical metal members overlap each other; and wherein the laser welding is performed on the overlap range along a circumferential direction of the overlap range. The assessment method includes: during the laser welding, carrying out a measurement of a position of a contour of at least one of the first and second (Continued)

cylindrical metal members; and judging the occurrence or non-occurrence of a position deviation of the at least one of the first and second cylindrical metal members based on a result of the measurement.

17 Claims, 5 Drawing Sheets

(51) Int. Cl.
*G01N 21/95* (2006.01)
*B23K 26/03* (2006.01)
*B23K 26/244* (2014.01)
*B23K 26/282* (2014.01)
*G06T 7/70* (2017.01)
*B23K 31/12* (2006.01)
*G01B 11/14* (2006.01)
*G01B 11/24* (2006.01)

(52) U.S. Cl.
CPC .......... *B23K 26/282* (2015.10); *B23K 31/125* (2013.01); *G01B 11/14* (2013.01); *G01B 11/24* (2013.01); *G01N 21/88* (2013.01); *G01N 21/8806* (2013.01); *G01N 21/95* (2013.01); *G06T 7/70* (2017.01); *G01N 2201/062* (2013.01)

(58) Field of Classification Search
CPC .... B23K 26/244; B23K 26/032; G01N 21/88; G01N 21/8806; G01N 21/95; G01N 2201/062
See application file for complete search history.

(56) References Cited

U.S. PATENT DOCUMENTS

| | | | | |
|---|---|---|---|---|
| 6,596,961 B2* | 7/2003 | Ehlers | .................... | B23K 26/03 219/121.63 |
| 6,670,574 B1* | 12/2003 | Bates | .................... | B23K 26/03 219/121.63 |
| 7,620,233 B2* | 11/2009 | Beck | .................... | B23K 26/032 219/121.13 |
| 8,350,184 B2* | 1/2013 | Behr | .................... | B23K 26/044 219/121.63 |
| 8,716,627 B2* | 5/2014 | Saunders | ............... | B23K 26/24 219/136 |
| 2004/0134891 A1* | 7/2004 | Schumacher | .......... | B23K 26/04 219/121.63 |
| 2007/0160510 A1* | 7/2007 | Schultz | ................... | F01N 11/00 422/177 |
| 2014/0042126 A1* | 2/2014 | Iwatani | .................. | B23K 31/02 219/57 |

FOREIGN PATENT DOCUMENTS

| | | |
|---|---|---|
| JP | H11-33760 A | 2/1999 |
| JP | 2001-174414 A | 6/2001 |
| JP | 2004-219154 A | 8/2004 |
| JP | 2004-354274 A | 12/2004 |
| JP | 2009-220155 A | 10/2009 |
| JP | 2010-197247 A | 9/2010 |
| JP | 2014-032076 A | 2/2014 |
| WO | 2012/147199 A1 | 11/2012 |

* cited by examiner

ASSESSMENT METHOD, LASER DEVICE, AND SENSOR PRODUCTION METHOD

FIELD OF THE INVENTION

The present invention relates to a laser welding assessment method, a laser device, and a sensor production method.

BACKGROUND ART

Conventionally, laser welding is known as a technique for welding of structural members. As a method of checking the accurate formation of a welded part by laser welding, Patent Document 1 discloses judging a welding defect by non-contact monitoring of reflected light of laser light or plasma light emitted from the welded part during the laser welding.

PRIOR ART DOCUMENTS

Patent Documents

Patent Document 1: Japanese Laid-Open Patent Publication No. 2010-197247
Patent Document 2: Japanese Laid-Open Patent Publication No. 2004-354274

SUMMARY OF THE INVENTION

Problems to be Solved by the Invention

In the above conventional judgment method, reflected light of laser light or plasma light emitted from the welded part is monitored. By such light monitoring, however, the welding defect may be misjudged so that it is impossible to accurately assess the quality of the welding. There has thus been a demand to develop a more accurate welding assessment method.

Means for Solving the Problems

The present invention has been made to address the above problem and can be embodied as the following application examples.

(A1) According to one aspect of the present invention, there is provided an assessment method for making an assessment of laser welding between first and second cylindrical metal members, the first and second cylindrical metal members being arranged coaxially to define an overlap range where the first and second cylindrical metal members overlap each other, the laser welding being performed on the overlap range along a circumferential direction of the overlap range, the assessment method comprising: during the laser welding, carrying out a measurement of a position of a contour of at least one of the first and second cylindrical metal members; and judging the occurrence or non-occurrence of position deviation of the at least one of the first and second cylindrical metal members based on a result of the measurement.

In this assessment method, the occurrence or non-occurrence of position deviation of the at least one of the first and second cylindrical metal members is judged during the laser welding. The judgment of no position deviation means that laser irradiation is applied to a proper position. Namely, the occurrence or non-occurrence of welding position deviation is judged in this assessment method. The welding is performed favorably when the laser irradiation is applied to its proper position. It is therefore possible in this assessment method to assess the quality of the welding by judging the occurrence or non-occurrence of the position deviation.

(A2) The above assessment method may further comprises: before the laser welding, carrying out another measurement of a position of a contour of at least one of the first and second cylindrical metal members; and judging the occurrence or non-occurrence of position deviation of the at least one of the first and second cylindrical metal members based on a result of the another measurement.

In this case, the occurrence or non-occurrence of the position deviation is judged before the laser welding. It is thus possible to prevent a welding defect before it occurs. When the position deviation is judged before the laser welding, it is possible to start the welding after correcting the position of the cylindrical metal member.

(A3) The above assessment method may further comprises: a position check step of taking an image of a reference object with the same camera as that used for the measurement of the contour in the measurement step, and then, checking the occurrence or non-occurrence of position deviation of the camera based on the image of the reference object.

In this case, it is possible to more accurately judge the position deviation by judging the occurrence or non-occurrence of position deviation of the camera.

(A4) In the above assessment method, the measurement may be carried out during the laser welding while causing rotation of the first and second cylindrical metal members about an axis thereof.

It is possible in this assessment method to more accurately judge the welding position deviation by carrying out the measurement from various angles.

(A5) In the above assessment method, the position deviation may be judged as not occurring when a number of detections of the position deviation during the laser welding is smaller than a predetermined value, which is greater than 1, and be judged as occurring when the number of detections of the position deviation during the laser welding becomes equal to or greater than the predetermined value.

In this case, the occurrence of the position deviation is not determined unless the number of detections of the position deviation becomes equal to or higher than the predetermined value. It is thus possible to remove noise and more accurately judge the welding position deviation.

(A6) In the above assessment method, the measurement may be carried out to measure the position of the laser non-irradiation side contour, except the laser irradiation side contour, of the at least one of the first and second cylindrical metal members.

In this case, it is possible to reduce the influence of laser light on the measurement result and thereby possible to more accurately judge the welding position deviation.

(B) According to another aspect of the present invention, there is provided a laser device, comprising: an irradiation unit that irradiates an overlap range of coaxially arranged first and second cylindrical metal members with laser light along a circumferential direction of the overlap range; and a controller that controls the irradiation unit, wherein the laser device further comprises: a measurement unit that carries out a measurement of a position of a contour of at least one of the first and second cylindrical metal members; wherein the irradiation unit and the measurement unit are arranged such that an irradiation direction of the laser light from the irradiation unit is non-parallel to a measurement direction of the measurement unit; and wherein the controller controls the measurement unit to carry out the measurement of the position during irradiation of the overlap range with the laser light from the irradiation unit, and then, judges the occurrence or non-occurrence of position deviation of the at least one of the first and second cylindrical metal members based on a result of the measurement.

In this laser device, the occurrence or non-occurrence of position deviation of the at least one of the first and second cylindrical metal members is judged during e.g. laser welding. The judgment of no position deviation means that laser irradiation is applied to a proper position. It is therefore possible in this laser device to accurately judge the occurrence or non-occurrence of welding position deviation.

(C) According to still another aspect of the present invention, there is provided a sensor production method for producing a sensor with first and second cylindrical metal members, comprising laser welding of the first and second cylindrical metal members, wherein the sensor production method further comprises: a position check step of taking an image of a reference object with a camera and judging the occurrence or non-occurrence of position deviation of the camera based on the image of the reference object; a step of, during the laser welding, carrying out a measurement of a position of a contour of the at least one of the first and second cylindrical metal members by taking an image of the contour with the camera; and a step of judging the occurrence or non-occurrence of position deviation of the at least one of the first and second cylindrical metal members based on a result of the measurement.

In this sensor production method, the occurrence or non-occurrence of welding position deviation of the first and second cylindrical metal members is judged more accurately. The laser welding is performed favorably when laser irradiation is applied to a proper position. It is therefore to assess the quality of the welding by judging the occurrence or non-occurrence of the position deviation.

(D) According to yet another aspect of the present invention, there is provided an assessment method for making an assessment of laser welding between first and second cylindrical metal members, the first and second cylindrical metal members being arranged coaxially to define an overlap range where the first and second cylindrical metal members overlap each other, the laser welding being performed on the overlap range along a circumferential direction of the overlap range, the assessment method comprising: during the laser welding, carrying out a measurement of a position of a contour of a predetermined region of the first cylindrical metal member and a measurement of a position of a contour of a predetermined region of the second cylindrical metal member; and judging the occurrence or non-occurrence of position deviation of the first and second cylindrical metal members based on results of the measurements.

In this assessment method, the occurrence or non-occurrence of position deviation of each of the first and second cylindrical metal members is judged for judgment of welding position deviation. It is therefore possible to assess the quality of the welding by judging the occurrence or non-occurrence of the position deviation.

It should be noted that the present invention can be embodied in various forms including not only an assessment method but also a formed body obtained as a result of such an assessment method.

DESCRIPTION OF EMBODIMENTS

A. First Embodiment

A-1. Structure of Gas Sensor

Figure 1:
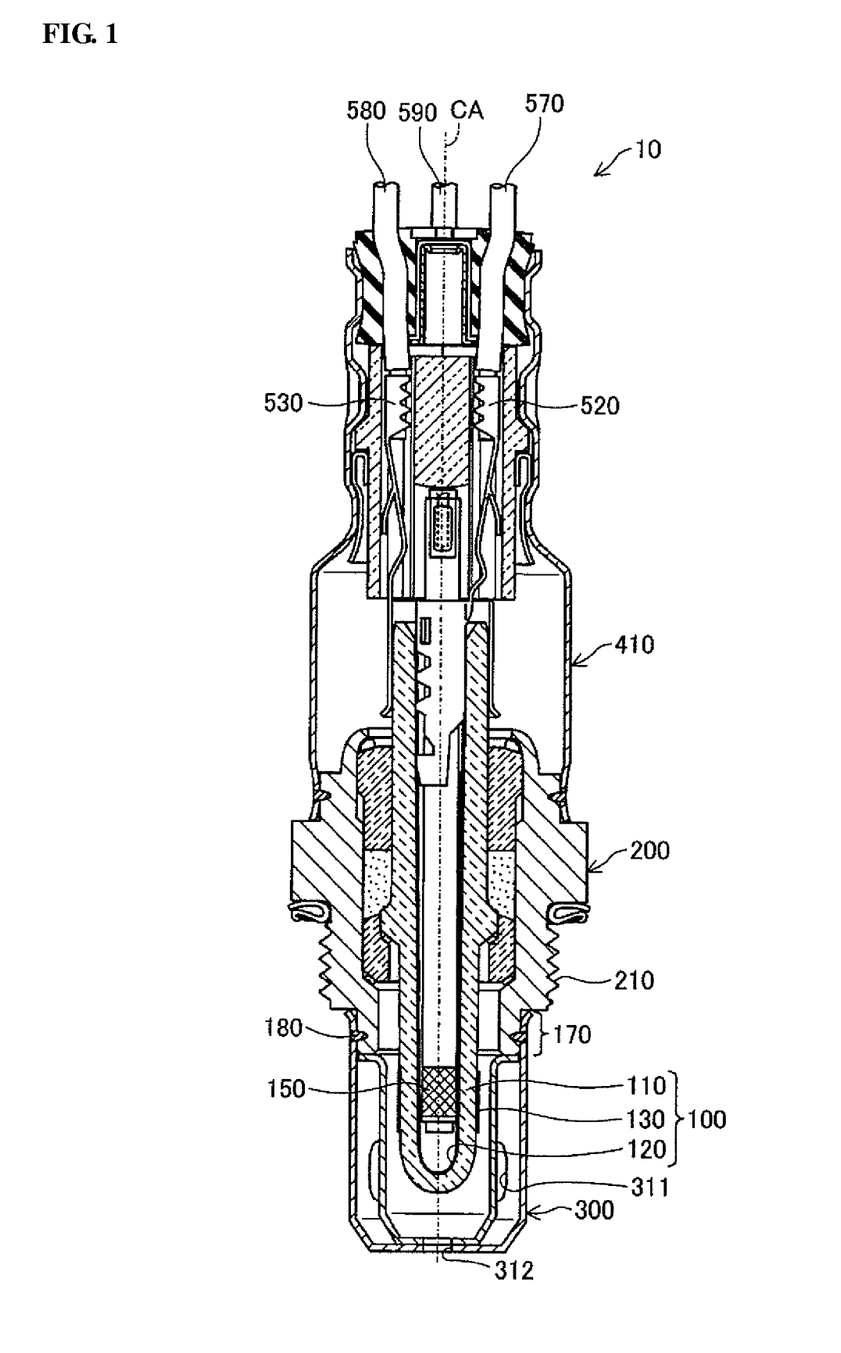
FIG. 1 is a schematic cross-sectional view of a gas sensor 10 as an example of an object to be assessed.

FIG. 1 is a schematic cross-sectional view of a gas sensor 10 as an example of an object to be assessed. In FIG. 1, a cross section of the gas sensor 10 taken along a center axis CA of the gas sensor 10 is shown. In the following description, the bottom side of FIG. 1 is referred to as a "front side" of the gas sensor 10; and the top side of FIG. 1 is referred to as a "rear side" of the gas sensor 10.

The gas sensor 10 is in the form of an oxygen sensor mounted to an exhaust system of an internal combustion engine so as to detect the concentration of oxygen ($O_2$) in exhaust gas. In the present embodiment, the gas sensor 10 is configured as a zirconia oxygen sensor using zirconium oxide ($ZrO_2$).

As shown in FIG. 1, the gas sensor 10 is equipped with a sensor element 100, a heating element 150, a metal shell 200, a protector 300, an outer tube 410, a first output terminal 520, a second output terminal 530, a first lead wire 570, a second lead wire 580 and a third lead wire 590.

The sensor element 100 of the gas sensor 10 constitutes an oxygen concentration cell that outputs an electromotive force according to a partial pressure of oxygen. The sensor element 100 includes a solid electrolyte body 110, an inner electrode 120 and an outer electrode 130.

The solid electrolyte body 110 of the sensor element 100 is made of an oxide-ion conducting (oxygen-ion conducting) material, and has a bottomed cylindrical shape formed with a closed front end and extending along the center axis CA. In the present embodiment, zirconium oxide ($ZrO_2$) containing yttrium oxide ($Y_2O_3$), that is, yttria partially stabilized zirconia is used as the material of the solid electrolyte body 110. In other alternative embodiments, a partially stabilized zirconia containing an oxide selected from calcium oxide (CaO), magnesium oxide (MgO), cerium oxide (CeO), aluminum oxide ($Al_2O_3$) and the like may be used as the material of the solid electrode body 110.

The inner electrode 120 of the sensor element 100 is arranged so as to cover an inner side of the solid electrolyte body 110. The outer electrode 130 of the sensor element 100 is arranged so as to cover an outer side of the solid electrolyte body 110. In the present embodiment, platinum (Pt) is used as the materials of the inner electrode 120 and the outer electrode 130. In other alternative embodiments, a platinum alloy, other noble metal or alloy thereof may be used. Further, the inner electrode 120 and the outer electrode 130 are formed by electroless plating in the present embodiment.

The heating element 150 of the gas sensor 10 is located inside the sensor element 100 so as to heat the sensor element 100 upon receipt of power supply through the third lead wire 590. For the purpose of improving the accuracy of the gas sensor 10, the temperature of the sensor element 100 is maintained constant by controlling the power supply from through the third lead wire 590 to the heating element 150 in the present embodiment.

The metal shell 200 of the gas sensor 10 is provided as a cylindrical metal member. The sensor element 100 is held in the metal shell 100. A thread portion 210 is formed on an outer circumference of the metal shell 200 such that the gas sensor 10 is mounted to the exhaust pipe by means of the thread portion 210.

The protector 300 of the gas sensor 10 is provided as a bottomed-cylindrical metal member and is fixed to a front end portion of the metal shell 200 so as to cover a part of the sensor element 100 protruding from a front end of the metal shell 200 and serve as a protection for the sensor element 100. Though holes 311 and 312 are formed in the protector 300 such that the exhaust gas can be introduced to the sensor element 100 through these through holes.

The metal shell 200 and the protector 300 are arranged coaxially such that a rotation axis of the metal shell 200 and the protector 300 is in agreement with the center axis CA. There is defined an overlap range 170 where the metal shell 200 and the protector 300 overlap each other. The protector 300 is joined to the metal shell 200 by performing laser welding on the overlap range 170 along the circumferential direction and thereby forming a welding part 180 in the overlap range. A process for judging the occurrence or non-occurrence of position deviation during the laser welding of the overlap range 170 will be explained later.

The outer tube 410 of the gas sensor 10 is provided as a cylindrical metal member and is fixed to a rear end portion of the metal shell 200 so as to cover parts of the sensor element 100, the heating element 150, the first output terminal 520 and the second output terminal 530 protruding from a rear end of the metal shell 200 and serve as a protection for the sensor element 100, the heating element 150, the first output terminal 520 and the second output terminal 530.

In the present embodiment, the sensor element 100 is adapted to allow introduction of outside air to the inside of the sensor element 100. The outside air introduced to the inside of the sensor element 100 is utilized as reference gas that becomes a reference for detection of oxygen in the exhaust gas by the gas sensor 10.

The first output terminal 520 of the gas sensor 10 is formed as a conductor so as to establish an electrical connection between the inner electrode 120 of the sensor element 100 and the first lead wire 570. The second output terminal 530 of the gas sensor 10 is formed as a conductor so as to establish an electrical connection between the outer electrode 130 of the sensor element 100 and the second lead wire 580. The first lead wire 570 and the second lead wire 580 of the gas sensor 10 are electrically connected to a processing circuit (not shown) for processing of the output of the gas sensor 10.

In the gas sensor, the inner electrode 120 functions as a reference electrode exposed to the outside air, that is, the reference gas; and the outer electrode 130 functions as a detection gas exposed to the exhaust gas. The electromotive force is thus developed in the sensor element 100 according to a difference in oxygen concentration between the reference gas and the exhaust gas. The electromotive force of the sensor element 100 is outputted as the sensor output to the outside of the gas sensor 10 through the first lead wire 570 and the second lead wire 580.

A-2. Laser Device

Figure 2:
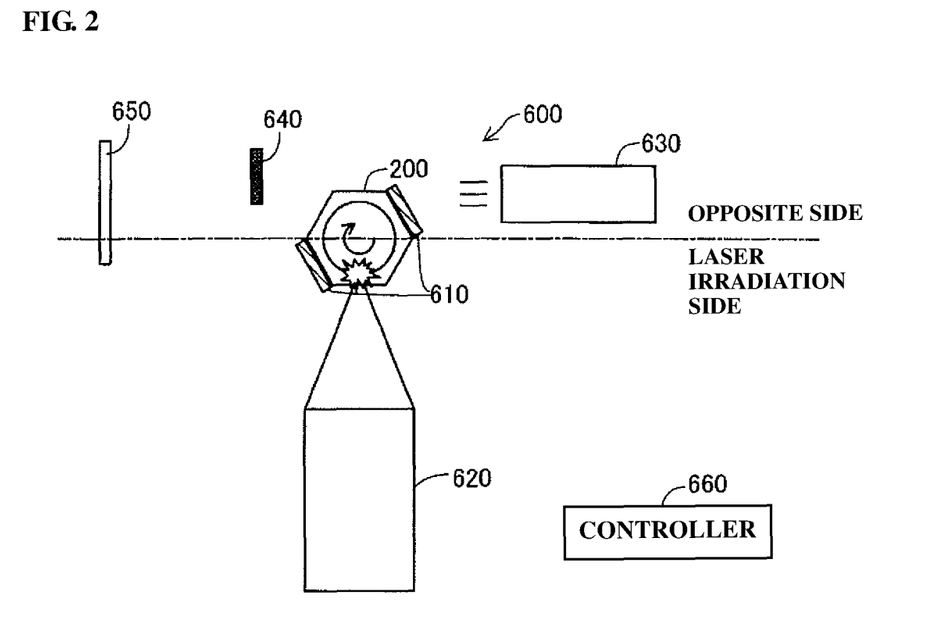
FIG. 2 is a schematic view of a laser device 600 as seen from a rear end side of the gas sensor 10.

FIG. 2 is a schematic view of a laser device 600 as seen from a rear end side of the gas sensor 10. In the present embodiment, the laser device 600 is used to form the welded part 180 between the metal shell 200 and the protector 300. The laser device 600 is equipped with a holding member 610, an irradiation unit 620, a measurement unit 630, a check plate 640, a lighting unit 650 and a controller 660.

Figure 3:
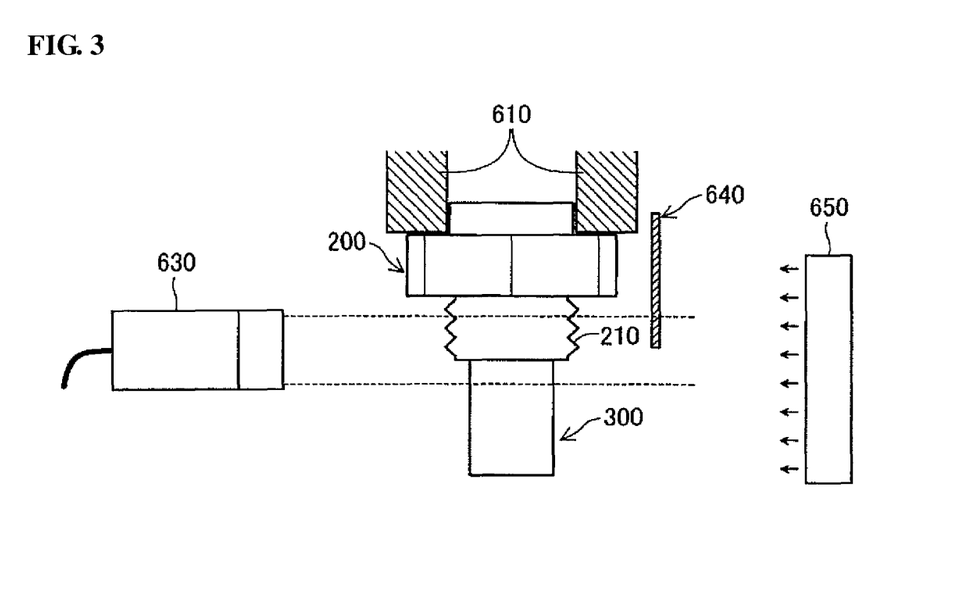
FIG. 3 is a schematic view of the laser device 600 as seen from a lateral side of the gas sensor 10

FIG. 3 is a schematic view of the laser device 600 as seen from a lateral side of the gas sensor 10. The holding member 610 is arranged to hold the metal shell 200 and, in a state of holding the metal shell 200, allow the metal shell 200 and the protector 300 to rotate about their rotation axis.

The irradiation unit 620 is adapted to emit laser light (see FIG. 2). The overlap range 170 of the metal shell 200 and the protector 300 is irradiated with the laser light from the irradiation unit 620 along the circumferential direction.

The measurement unit 630 is adapted to measure a position of a contour of at least one of the metal shell 200 and the protector 300. In the present embodiment, a camera is used as the measurement unit 630. An infrared sensor may alternatively be used as the measurement unit 630. It is preferable that the measurement unit 630 measures the contour of a predetermined region of the metal shell 200 and the contour of a predetermined region of the protector 300.

The check plate 640 is made of a metal plate material and arranged between the measurement unit 630 and the lightening unit 650. This check plate 640 is used as a reference object to check whether the measurement unit 630 is in proper position.

The lighting unit 650 is adapted to highlight the contour of the at least one of the metal shell 200 and the protector 300. The lighting unit 650 is arranged such that the check plate 640 and the lighting unit 650 overlap in position when viewed from the measurement unit 630. In the present embodiment, an LED is used as the lighting unit 650.

The controller 660 is configured as a control unit to control the respective components of the laser device. The controller 660 is provided with CPU, RAM and ROM for control of the device components.

In the present embodiment, the irradiation unit 620 and the measurement unit 630 are arranged such that the irradiation direction of the laser light from the irradiation unit 620 is non-parallel to the measurement direction of the measurement unit 630, that is, the laser light irradiation direction of the irradiation unit 620 and the measurement direction of the measurement unit 630 intersect each other. By such arrangement, it is possible to reduce the influence of the laser light emitted from the irradiation unit 620 on the measurement of the contour of the at least one of the metal shell 200 and the protector 300. This allows more accurate judgment of the position deviation. Herein, the "position deviation" refers to at least one of positional deviation of either or both of the metal shell 200 and the protector 300 relative to the jig (holding member 610) or relative positional deviation between the metal shell 200 and the protector 300.

Furthermore, the measurement unit 630 is arranged to measure the position of the laser non-irradiation side contour, rather than the laser irradiation side contour, of the at least one of the metal shell 200 and the protector 300 in the present embodiment. In other words, assuming that the metal shell 200 and the protector 300 are divided into two sides: one side closer to the irradiation unit 620 (i.e. laser irradiation side) and the other side (i.e. opposite side) as shown in FIG. 2, the measurement unit 630 is situated on the opposite side. Then, the measurement unit 630 measures the position of the contour of the at least one of the metal shell 200 and the protector 300 opposite to the laser irradiation side. It is possible by this configuration to reduce not only the influence of the laser light emitted from the irradiation unit 620 but also the influence of spatter generated by the laser welding. This allows more accurate judgment of the position deviation, which leads to more accurate judgment of welding position deviation.

A-2. Judgment Process

Figure 4:
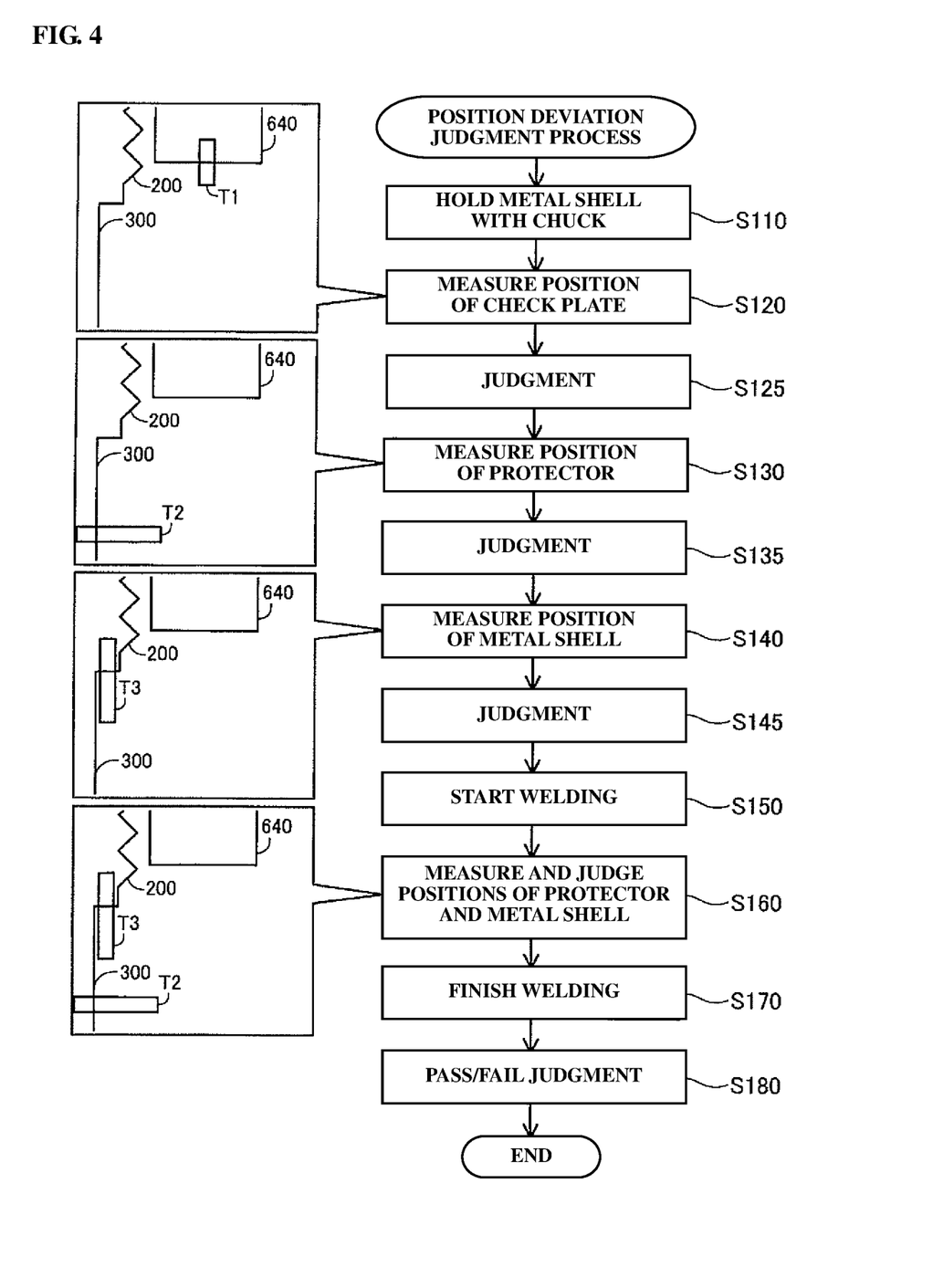
FIG. 4 is a flowchart of a process for judging the occurrence or non-occurrence of position deviation.

FIG. 4 is a flowchart of the process for judging the occurrence or non-occurrence of the position deviation. In the present embodiment, the first and second cylindrical metal members discussed above in "Means for Solving the Problems" respectively correspond to the metal shell 200 and the protector 300.

In step S110, the controller 660 controls the holding member 610 to lift up and hold the metal shell 200 in which the protector 300 has been press-fitted.

Next, the controller 660 controls the measurement unit 630 to measure the position of the check plate 640 in step S120.

Figure 5:
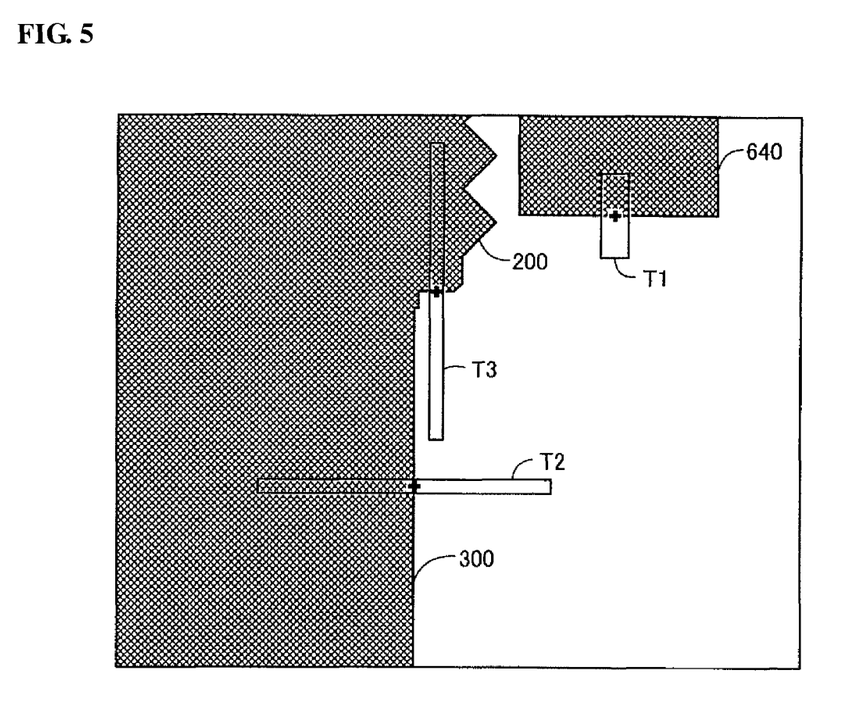
FIG. 5 is a schematic view showing an example of an image taken by a measurement unit 630.

FIG. 5 is a schematic view showing an example of an image taken by the measurement unit 630. The image includes: an area T1 for measuring the contour of the check plate 640 as the reference object; an area T2 for measuring the contour of the protector 300; and an area T3 for measuring the contour of the metal shell 200. In the subsequent steps, the position of the contour of at least one of the metal shell 200, the protector 300 and the check plate 640 is measured. The locations of the area T1, the area T2 and the area T3 are set so as not to overlap one another, so that the position deviation of each of the metal shell 200, the protector 300 and the check plate 640 can be judged with reference to the corresponding area.

In step S120 (see FIG. 4), the controller controls the measurement unit 630 to measure the position of the contour of the check plate 640 in the area T1. Then, the controller 660 judges in step S125 the occurrence or non-occurrence of the position deviation of the measurement unit 630 based on the measurement result. More specifically, the process proceeds to the next step when the position of the contour of the check plate 640 is within a predetermined allowable range with respect to a reference position previously stored in the controller 660. When the position of the contour of the check plate 640 is out of the predetermined allowable range with respect to the reference position previously stored in the controller 660, by contrast, the process does not proceed to the next step. Instead, the controller 660 notifies a user of the occurrence of the position abnormality by means of a sound or light and stands by until receipt of a signal indicating that user's check has been finished. By this step, it is confirmed whether the measurement unit 630 is in proper position. Further, the position of the measurement unit 630 can be corrected to its proper position upon detection of the position abnormality. The position check step discussed above in "Means for Solving the Problems" thus corresponds to step S125. Namely, step S125 is a step of judging the occurrence or non-occurrence of position deviation of the measurement unit 630 used for the measurement of the contour of the at least one of the metal shell 200 and the protector 300. The position deviation of the measurement unit 300 in the vertical direction is judged by this step. Since the measurement unit 300 is movable only in the vertical direction in the present embodiment, the area T1 is set so as to check the reference position in the vertical direction. It is alternatively feasible to check the reference position in not only the vertical direction but also the horizontal direction. Various objects other than the check plate 640 are usable as the reference object for judgment of the position deviation of the measurement unit 630. For example, there can be used an object with a reference mark (such as cross mark) to check the reference position in the vertical direction or horizontal direction on the image. In this case, the position deviation of the measurement unit 630 is judged by measuring the position of the reference mark on the image instead of measuring the contour of the reference object.

In step S130, the controller 660 controls the measurement unit 630 to measure the position of the protector 300 and, more specifically, the position of the contour of the protector 300 in the area T2. The position of the contour herein measured is the position of the contour in the horizontal direction. This measurement step can be carried out while holding the metal shell 200 and the protector 300 in a stop condition without rotation or while causing rotation of the metal shell 200 and the protector 300.

The controller 660 then judges in step S135 the occurrence or non-occurrence of the position deviation of the protector 300 based on the measurement result. When the position of the contour of the protector 300 is within a predetermined allowable range with reference to a reference position previously stored in the controller 660, the process proceeds to the next step. When the position of the contour of the protector 300 is out of the predetermined allowable range with respect to the reference position previously stored in the controller 660, by contrast, the process does not proceed to the next step. Instead, the controller 660 notifies a user of the occurrence of the position abnormality by means of a sound or light and stands by until receipt of a signal indicating that user's check has been finished. By this step, the position deviation of the protector 300 in the horizontal direction is judged.

In step S140, the controller 660 controls the measurement unit 630 to measure the position of the metal shell 200 and, more specifically, the position of the contour of the metal shell 200 in the area T3. The position of the contour herein measured is the position of the contour in the vertical direction. This measurement step can also be carried out while holding the metal shell 200 and the protector 300 in a stop condition without rotation or while causing rotation of the metal shell 200 and the protector 300.

The controller 660 then judges in step S145 the occurrence or non-occurrence of the position deviation of the metal shell 200 based on the measurement result. When the position of the contour of the metal shell 200 is within a predetermined allowable range with respect to a reference position previously stored in the controller 660, the process proceeds to the next step. When the position of the contour of the metal shell 200 is out of the predetermined allowable range with respect to the reference position previously stored in the controller 660, by contrast, the process does not proceed to the next step. Instead, the controller 660 notifies a user of the occurrence of the position abnormality by means of a sound or light and stands by until receipt of a signal indicating that user's check has been finished. By this step, the position deviation of the metal shell 200 in the vertical direction is judged. Further, the production of the defective product is prevented by not proceeding to the next step when the position of the contour of the metal shell 200 is out of the predetermined allowable range with respect to the reference position previously stored in the controller 660.

In step S150, the controller 660 starts welding operation, i.e., laser welding on the overlap range 170 along the circumferential direction by the irradiation unit 620 while causing rotation of the metal shell 200 and the protector 300 by the holding member 610.

In step S160, the controller 660 controls the measurement unit to measure the positions of the metal shell 200 and the protector 300 during the irradiation of the overlap range with the laser light from the irradiation unit 620 and then judges the occurrence or non-occurrence of the position deviation of the metal shell 200 and the protector 300 based on the measurement results. More specifically, the measurement unit 630 measures the position of the contour of the protector 300 in the area T2 and the position of the contour of the metal shell 200 in the area T3. The controller judges the occurrence of the position deviation based on these measurement results. It is preferable in this step to measure the positions of the metal shell 200 and the protector 300 while causing rotation of the metal shell 200 and the protector 300. The occurrence or non-occurrence of the position deviation can be judged while causing rotation of the metal shell 200 and the protector 300 or while holding the metal shell 200 and the protector 300 in a stop condition (e.g. after the welding). In the present embodiment, the contour of the object is employed as the measurement target. It is thus possible in the present embodiment to suppress deterioration of measurement accuracy caused by any object other than the originally intended measurement target as compared to the case where light source such as reflected light of laser light or plasma light is employed as the measurement target.

Figure 6:
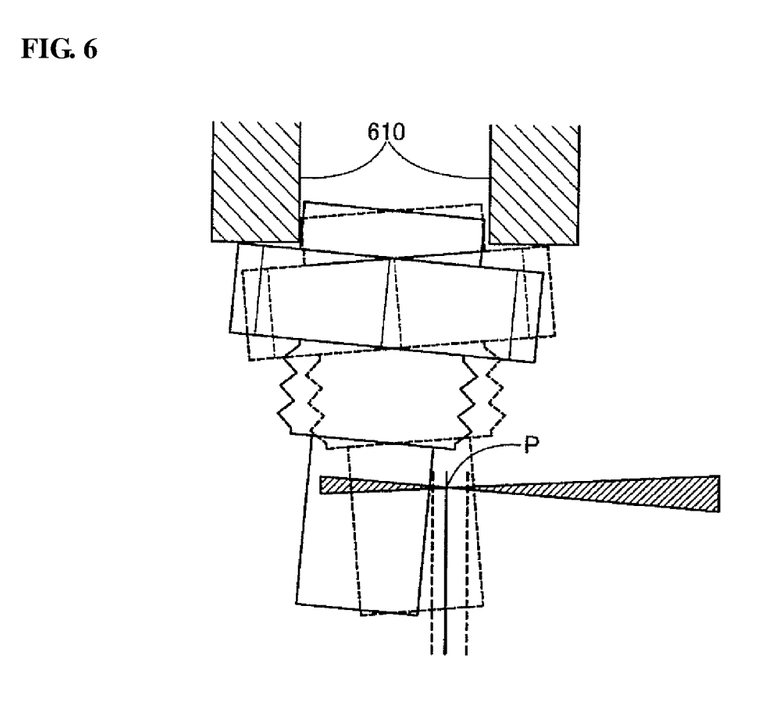
FIG. 6 is a schematic view showing a state where there occurs position deviation of an axis CA of a metal shell 200 and a protector 300 relative to a rotation axis of a holding member 610.

FIG. 6 is a schematic view showing a state where the axis CA of the metal shell 200 and protector 300 deviates from the rotation axis of the holding member 610. In the state where the axis CA of the metal shell 200 and the protector 300 deviates from the rotation axis of the holding member 610, the positions of the metal shell 200 and the protector 300 are displaced relative to the focal point P of the laser light so that the degree of penetration of the laser light at the laser welding position does not become uniform. Even in the case where the position deviation cannot be detected before the welding, it is possible to detect the position deviation during the welding by carrying out the measurement during the welding. In other words, it is possible to detect the position deviation during the welding even in the case where, before the welding, the position deviation is occurring in the direction in which the position deviation is difficult to measure by the measurement unit 630 (i.e. in the measurement direction of the measurement unit 630 before the rotation).

It is preferable in the present embodiment the the measurement of the position is carried out three times or more per one rotation of the metal shell 200 and the protector 300 about the axis CA. It is possible by such operation to measure the position of the object from various angles. This allows more accurate judgment of the position deviation, which leads to more accurate judgment of welding position deviation. When the measurement is carried out three times at equal intervals per one rotation, for example, it means that the measurement is carried out at intervals of 120°. In the present embodiment, the measurement of the position is carried out ten to fifteen times.

It is further preferable in the present embodiment that the controller 660 does not determine the occurrence of the position deviation when the number of times of detection of the position deviation is smaller than a predetermined value, which is greater than 1, and determine the occurrence of the position deviation when the number of times of detection of the position deviation becomes equal to or greater than the predetermined value. It is possible by this operation to remove noise and more accurately judge the welding position deviation. In the present embodiment, the predetermined value is set to 3.

In step S170, the controller 660 finishes the welding operation of the irradiation unit 620. After that, the controller 660 determines in step S180 the occurrence or non-occurrence of a welding defect due to the position deviation. When the position deviation of the metal shell 200 or the protector 300 is judged in step S160 as not occurring, it is determined that there is no welding defect caused due to the position deviation. Namely, it is judged that the laser irradiation is applied to its proper position when the position deviation is judged as not occurring during the welding.

When the position deviation of at least one of the metal shell 200 and the protector 300 is judged in step S160 as occurring, on the other hand, it is determined that the welding defect is caused by the improper irradiation with the laser light. In this case, the welded assembly of the metal shell 200 and the protector 300 is handled as the defective product.

B. Other Embodiments

The present invention is not limited to the above specific embodiments, examples and modifications and can be embodied in various forms without departing from the scope of the present invention. For example, it is possible to appropriately replace or combine any of the technical features of the embodiments, examples and modifications corresponding to those mentioned above in "Summary of the Invention" for the purpose of solving a part or all of the above-mentioned problems or achieving a part or all of the above-mentioned effects. Any of these technical features, if not explained as essential in the present specification, may be eliminated as appropriate.

In the above embodiment, the process proceeds to the next step upon judging in step S135 that the position of the protector 300 is within the predetermined allowable range with respect to the reference position previously stored in the controller 660. In step S135, the location of the area T2 or the reference position in the area T2 may be corrected based on the amount of the position deviation. Similarly, the location of the area T3 or the reference position in the area T3 may be corrected in step S145 upon judging that the position of the metal shell 200 is within the predetermined allowable range with respect to the reference position. In sum, it is feasible to, when the position deviation before the welding is in the allowable range, correct the location of the area T2, T3 or the reference position in the area T2, T3 based on the amount of the position deviation such that the contour positions of the metal shell 200 and the protector 300 can be measured with reference to the corrected areas T2, T3 in step S160. This leads to flexible judgment of the position deviation. In particular, the vertical position of the metal shell 200 is measurable at a flat surface region of the metal shell 200 in front of the thread portion 210 in the above embodiment. Such a surface region is narrow. It is however possible by the above correction to flexibly judge the position deviation.

In the above embodiment, the judgment is made on the position deviation in the (step S145) after the judgment made on the position deviation in the horizontal direction (step S135). The present invention is however not limited to such judgment process. It is alternatively feasible to judge the position deviation in the horizontal direction after judging the position deviation in the vertical direction or feasible to judge the position deviation in only either one of the horizontal direction and the vertical direction. Although only the position deviation of the protector 300 in the horizontal direction is judged in the above embodiment, it is alternatively feasible to judge only the position deviation of the protector 300 in the vertical direction or judge the position deviation of the protector 300 in both of the horizontal direction and the vertical direction. Although only the position deviation of the metal shell in the vertical direction is judged in the above embodiment, it is alternatively feasible to judge only the position deviation of the metal shell 200 in the horizontal direction or judge the position deviation of the metal shell 200 in both of the horizontal direction and the vertical direction.

The above embodiment specifically refers to the assessment of the welding of the metal shell 200 as the first cylindrical metal member and the protector 300 as the second cylindrical metal member. Alternatively, the other structural members can be adopted as the first and second cylindrical metal members in the present invention. The present invention is applicable to the welding of cylindrical metal structural members of any sensor other than the gas sensor. Namely, the present invention is widely applicable to the production of a sensor by laser welding on an overlap range of coaxially arranged first and second cylindrical metal members.

DESCRIPTION OF REFERENCE NUMERALS

10: Gas sensor
100: Sensor element
110: Solid electrolyte body
120: Inner electrode
130: Outer electrode
150: Heating element
170: Overlap range
180: Welded part
200: Metal shell
210: Thread portion
300: Protector
410: Outer tube
520: First output terminal
530: Second output terminal
570: First lead wire
580: Second lead wire
590: Third lead wire
600: Laser device
610: Holding member
620: Irradiation unit
630: Measurement unit
640: Check plate (Reference object)
650: Lightening unit
660: Controller
P: Focal point
T1: Area
T2: Area
T3: Area
CA: Center axis

What is claimed is:

1. An assessment method for making an assessment of laser welding between first and second cylindrical metal members, the first and second cylindrical metal members being arranged coaxially to define an overlap range where the first and second cylindrical metal members overlap each other, the laser welding being performed on the overlap range along a circumferential direction of the overlap range, the assessment method comprising:
during the laser welding, carrying out a measurement of a position of a surface of at least one of the first and second cylindrical metal members; and
judging the occurrence or non-occurrence of position deviation of the at least one of the first and second cylindrical metal members based on a result of the measurement;
wherein the measurement is carried out by taking an image of the surface with a measurement unit and a lighting unit with the first and second cylindrical metal members positioned between the measurement unit and the lighting unit such that light from the lighting unit passes by the surface before reaching the measurement unit.

2. The assessment method according to claim 1, further comprising:
before the laser welding, carrying out another measurement of a position of a surface of at least one of the first and second cylindrical metal members; and
judging the occurrence or non-occurrence of position deviation of the at least one of the first and second cylindrical metal members based on a result of the another measurement.

3. The assessment method according to claim 1,
wherein the measurement includes taking an image of the surface with a camera; and
wherein the assessment method further comprises: a position check step of taking an image of a reference object with the camera, and then, checking the occurrence or non-occurrence of position deviation of the camera based on the image of the reference object.

4. The assessment method according to claim 1,
wherein the measurement is carried out during the laser welding while causing rotation of the first and second cylindrical metal members about an axis thereof.

5. The assessment method according claim 4,
wherein the position deviation is judged as not occurring when a number of detections of the position deviation during the laser welding is smaller than a predetermined value that is greater than 1; and the position deviation is judged as occurring when the number of detections of the position deviation during the laser welding becomes equal to or greater than the predetermined value.

6. The assessment method according to claim 1,
wherein the measurement is carried out to measure the position of a laser non-irradiation side surface opposite from a laser irradiation side surface of the at least one of the first and second cylindrical metal members.

7. The assessment method according to claim 1,
wherein the measurement is carried out by taking an image of the overlap range with a camera while irradiating the overlap range with laser light from an irradiation unit which is situated on a side opposite from the camera with respect to the first and second cylindrical metal members, whereby the position of the surface is measured based on the taken image.

8. A laser device, comprising:
an irradiation unit that irradiates an overlap range of coaxially arranged first and second cylindrical metal members with laser light along a circumferential direction of the overlap range;
a controller that controls the irradiation unit;
a lighting unit that directs light towards the first and second cylindrical metal members; and
a measurement unit positioned across from the lighting unit relative to the first and second cylindrical metal members such that the measurement unit carries out a measurement of a position of a surface of at least one of the first and second cylindrical metal members with light from the lighting unit;

wherein the irradiation unit and the measurement unit are arranged such that, when viewed along an axis of the coaxially arranged first and second cylindrical metal members, an irradiation direction of the laser light from the irradiation unit is non-parallel to a measurement direction between the lighting unit and the measurement unit; and wherein the controller controls the measurement unit to carry out the measurement of the position during irradiation of the overlap range with the laser light from the irradiation unit, and then, judges the occurrence or non-occurrence of position deviation of the at least one of the first and second cylindrical metal members based on a result of the measurement.

9. The laser device according to claim 8, wherein the measurement unit is a camera;

wherein the controller controls the camera to take an image of a reference object and judges the occurrence or non-occurrence of position deviation of the camera based on the image of the reference object.

10. The laser device according to claim 8, wherein the controller controls the measurement unit to carry out the measurement during the irradiation of the overlap range with the laser light while causing rotation of the first and second cylindrical metal members about the axis of the coaxially arranged first and second cylindrical metal members.

11. The laser device according to claim 8 wherein the controller controls the measurement unit to measure the position of a laser non-irradiation side surface opposite from a laser irradiation side surface, of the at least one of the first and second cylindrical metal members.

12. The laser device according to claim 8, wherein, when viewed along the axis of the coaxially arranged first and second cylindrical metal members, the irradiation direction of the laser light from the irradiation unit is perpendicular to the measurement direction.

13. The laser device according to claim 8,
wherein the measurement unit is a camera;
and
wherein the measurement is carried out by taking an image of the overlap range with the camera while irradiating the overlap range with the laser light from the irradiation unit, whereby the position of the surface is measured based on the taken image.

14. A sensor production method for producing a sensor with first and second cylindrical metal members, comprising laser welding of the first and second cylindrical metal members,
wherein the sensor production method further comprises:
a position check step of taking an image of a reference object with a camera with light passing by the reference object from a lighting unit and judging the occurrence or non-occurrence of position deviation of the camera based on the image of the reference object;
a step of, during the laser welding, carrying out a measurement of a position of a surface of the at least one of the first and second cylindrical metal members by taking an image of the surface with the camera with light passing by the at least one of the first and second cylindrical metal members from the lighting unit; and
a step of judging the occurrence or non-occurrence of position deviation of the at least one of the first and second cylindrical metal members based on a result of the measurement;
wherein the first and second cylindrical metal members are positioned between the camera and the lighting unit.

15. The sensor production method according to claim 14
wherein the measurement is carried out during the laser welding while causing rotation of the first and second cylindrical metal members about an axis thereof.

16. The sensor production method according to claim 14,
wherein the measurement is carried out to measure the position of a laser non-irradiation side surface opposite from a laser irradiation side surface, of the at least one of the first and second cylindrical metal members.

17. The sensor production method according to claim 14, wherein the measurement is carried out by taking the image of the overlap range with the camera while irradiating overlap range with laser light from an irradiation unit which is situated on a side opposite from the camera with respect to the first and second cylindrical metal members, whereby the position of the surface is measured based on the taken image.

* * * * *

UNITED STATES PATENT AND TRADEMARK OFFICE
CERTIFICATE OF CORRECTION

PATENT NO. : 10,713,774 B2
APPLICATION NO. : 15/511282
DATED : July 14, 2020
INVENTOR(S) : Tsuyoshi Kondo and Atsushi Mori Page 1 of 1

It is certified that error appears in the above-identified patent and that said Letters Patent is hereby corrected as shown below:

In the Claims

Claim 17, Column 14, Line 43, insert --the-- between "irradiating" and "overlap"

Signed and Sealed this
Eighteenth Day of August, 2020

Andrei Iancu
*Director of the United States Patent and Trademark Office*